United States Patent
Bansode et al.

(10) Patent No.: US 10,353,605 B2
(45) Date of Patent: Jul. 16, 2019

(54) OPTIMIZING OFF-LOADED INPUT/OUTPUT (I/O) REQUESTS

(71) Applicant: INTERNATIONAL BUSINESS MACHINES CORPORATION, Armonk, NY (US)

(72) Inventors: Manish Bansode, Pune (IN); Shrirang S. Bhagwat, Pune (IN); Pankaj Deshpande, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/419,897

(22) Filed: Jan. 30, 2017

(65) Prior Publication Data

US 2018/0217766 A1    Aug. 2, 2018

(51) Int. Cl.
*G06F 3/06* (2006.01)

(52) U.S. Cl.
CPC ............ *G06F 3/0619* (2013.01); *G06F 3/061* (2013.01); *G06F 3/065* (2013.01); *G06F 3/067* (2013.01); *G06F 3/0665* (2013.01); *G06F 3/0689* (2013.01)

(58) Field of Classification Search
CPC ....... G06F 3/0619; G06F 3/065; G06F 3/0689
USPC ........................................................ 711/161
See application file for complete search history.

(56) References Cited

U.S. PATENT DOCUMENTS

| | | | |
|---|---|---|---|
| 7,318,168 B2 | 1/2008 | Goldberg et al. | |
| 8,332,354 B1 | 12/2012 | Chatterjee et al. | |
| 8,407,182 B1 | 3/2013 | Rajaa et al. | |
| 8,700,570 B1 | 4/2014 | Marathe et al. | |
| 8,725,692 B1 | 5/2014 | Natanzon et al. | |
| 2011/0072104 A2* | 3/2011 | Wayda | G06F 3/0607 709/217 |
| 2014/0181579 A1* | 6/2014 | Whitehead | G06F 17/30289 714/15 |
| 2016/0028816 A1 | 1/2016 | Day et al. | |

(Continued)

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Than Nguyen
(74) *Attorney, Agent, or Firm* — Robert C. Bunker

(57) ABSTRACT

Whether a replication relationship is established between a first and a second storage device is determined. If it is determined that the replication relationship is established between the first and second storage device, then whether data in the first region of the first storage device has changed since a previously completed asynchronous data replication process is determined. If the data in the first region of the first storage device has changed since the previously completed asynchronous data replication process, then whether the changed data in the first storage device is data copied from the second region of the first storage device is determined. If the changed data in the first region of the first storage device is data copied from the second region of the first storage device, then data from the second region of the second storage device is replicated to the first region of the second storage device.

20 Claims, 6 Drawing Sheets

(56) References Cited

U.S. PATENT DOCUMENTS

| | | | |
|---|---|---|---|
| 2016/0162372 A1* | 6/2016 | Whitehead | G06F 17/30289 |
| | | | 707/654 |
| 2017/0153954 A1 | 6/2017 | Schnapp et al. | |
| 2017/0154093 A1 | 6/2017 | Shetty et al. | |
| 2017/0235805 A1 | 8/2017 | Shetty et al. | |
| 2017/0249222 A1 | 8/2017 | Patnaik et al. | |
| 2017/0344290 A1* | 11/2017 | Horowitz | G06F 11/1474 |
| 2017/0344441 A1* | 11/2017 | Horowitz | G06F 11/1474 |
| 2018/0095684 A1* | 4/2018 | Benhase | G06F 3/0619 |
| 2018/0121107 A1* | 5/2018 | Borlick | G06F 3/0619 |
| 2018/0121302 A1* | 5/2018 | Miller | G06F 11/2064 |
| 2018/0246658 A1* | 8/2018 | Bretschneider | G06F 3/0619 |

OTHER PUBLICATIONS

IBM, "List of IBM Patents or Patent Applications Treated as Related (Appendix P)," Apr. 4, 2018, p. 1-2.

Bansode et al., "Optimizing Off-Loaded Input/Output (I/O) Requests," Application and Drawings, Filed on Sep. 29, 2017, 32 Pages, U.S. Appl. No. 15/720,746.

\* cited by examiner

US 10,353,605 B2

OPTIMIZING OFF-LOADED INPUT/OUTPUT (I/O) REQUESTS

FIELD OF THE INVENTION

The present invention relates generally to the field of asynchronous data replication environments, and more particularly processing incoming write requests from a host computer system in an asynchronous data replication environment.

SUMMARY

Embodiments of the present invention provide systems, methods, and computer program products for optimizing off-loaded I/O requests. Whether a replication relationship is established between a first and a second storage device is determined. If it is determined that the replication relationship is established between the first and second storage device, then whether data in the first region of the first storage device has changed since a previously completed asynchronous data replication process is determined. If the data in the first region of the first storage device has changed since the previously completed asynchronous data replication process, then whether the changed data in the first storage device is data copied from the second region of the first storage device is determined. If the changed data in the first region of the first storage device is data copied from the second region of the first storage device, then data from the second region of the second storage device is replicated to the first region of the second storage device.

DETAILED DESCRIPTION

Figure 1:
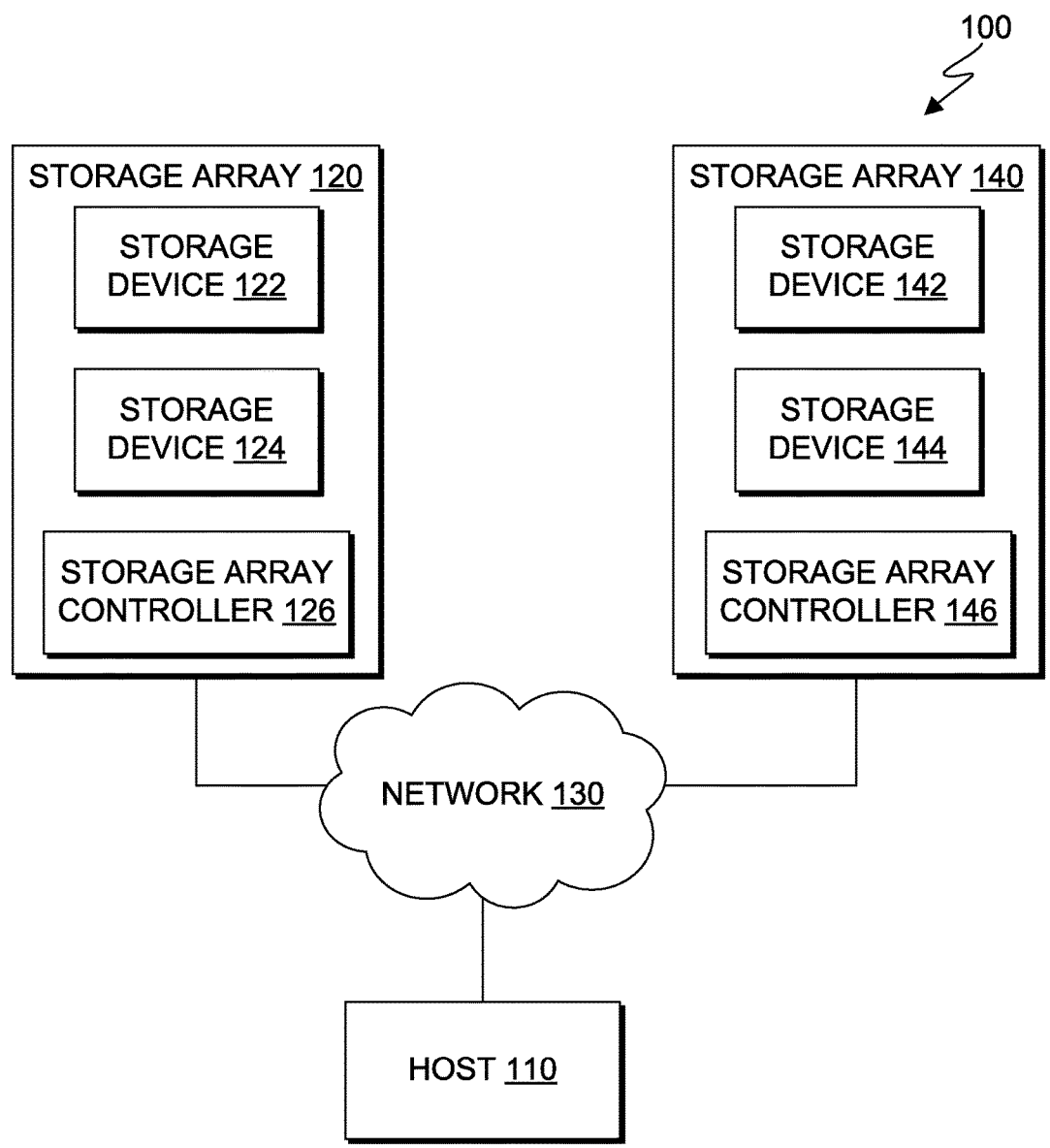
FIG. 1 is a block diagram of an distributed asynchronous data replication environment, in accordance with an embodiment of the present invention.

Various strategies, procedures and policies may be implemented as part of disaster recovery planning to enable the recovery or continuation of technology infrastructure and systems following a disruptive event, such as a natural or human-induced disaster. One such procedure may involve establishing a replication relationship between a primary storage location (e.g., a production storage volume) and a secondary storage location (e.g., an off-site storage volume, disaster recovery (DR) storage volume, etc.) which are operatively coupled over a network, such that an asynchronous data replication process may be performed. A replication relationship between the primary storage location and the remote storage location is necessary to capture data changes made in the primary storage location and then copying, or replicating, the captured data changes to the remote storage location.

For example, an asynchronous data replication environment may be configured to perform a Global Mirror with Change Volumes (GMCV) data replication process. In this example, the asynchronous data replication environment includes a primary storage location and a secondary storage location, where the primary storage location includes a primary storage volume and a primary change storage volume, and the secondary storage location includes a secondary storage volume and a secondary change storage volume. Furthermore, the primary storage volume can include one or more storage repositories that are used by a host and/or application to read and/or write data. If a host and/or application writes data to a region of the primary storage volume, then the data stored in the region of the primary storage volume changed, where a region may be logical and/or virtual portion (e.g., partition, sector, block, etc.) of memory. Accordingly, a GMCV cycle is performed as part of the asynchronous data replication process, such that the data change in the region of the primary storage volume is captured and subsequently copied, as described in greater detail below.

During the capture step, data stored in the primary storage volume is captured onto the primary change storage volume using, for example, a change map or FlashCopy®, which enables the asynchronous data replication environment to create point-in-time snapshot (e.g., nearly instantaneous) copies of entire logical volumes or data sets. Simultaneously, during the capture step, data stored in the secondary storage volume is captured onto the secondary change storage volume using, for example, FlashCopy®. Accordingly, the current state of the secondary storage volume is consistently captured to ensure the most recently synchronized (i.e., copied) version of data stored in the secondary storage location can be reverted back to if the replication relationship is no longer established (e.g., if network connectivity is lost or interrupted during the next copy step).

During the copy step, FlashCopy® mapping information may indicate whether regions in the primary storage volume were subjected to data changes since the previous GMCV cycle. For example, FlashCopy® mapping information may identify regions of the primary storage volume that changed between the current completed capture step and preceding completed capture step as well as whether the corresponding data changes have been copied, or replicated, to the secondary storage volume. If FlashCopy® mapping information indicates that the corresponding data changes have not been copied, or replicated, then it may be determined that the replication relationship between the primary storage location and the secondary storage location is no longer established. In this example, if the FlashCopy® mapping information identifies a particular region in the primary storage volume that includes 20 MB of changed data, then the changed data is captured and logically stored in the first change storage volume, and subsequently copied, or replicated, to the secondary storage volume.

The GMCV process allows a host and/or application to execute unrestricted read and write requests to the primary storage volume with reduced write latency compared to other synchronous data replication processes, such as a Metro Mirror® process. Typically, each write request made by the host and/or application to the primary storage volume is treated as a 'normal-write' request which undergoes the capture and copy step implemented by a GMCV process, as described above. In certain instances, the primary storage location can include more than one primary storage volume, such as a first primary storage volume and a second primary storage volume. Furthermore, the secondary storage location can include more than one secondary storage volume, such as a first secondary storage volume and a second secondary storage volume, where the first primary storage volume is in a replication relationship with the first secondary storage volume and the second primary storage volume is in a replication relationship with the second secondary storage volume. In these certain instances, a host and/or application may request a storage controller of the primary storage location to copy a portion of data stored in a region of the first primary storage volume to another region of the second primary storage volume. Accordingly, this copy operation (i.e., an 'off-loaded Input/Output (I/O)' request) is typically treated as a normal-write request, whereby the data copied from the first region of the first primary storage volume is captured into the primary change storage volume, and subsequently transmitted over the network and copied, or replicated, into the second secondary storage volume, thus ensuring that the second secondary storage volume and the second primary storage volume are in a replication relationship.

In this manner, handling an off-loaded I/O request as a normal-write request may result in unnecessary network bandwidth utilization, because the same data undergoes two transfers over the network from the primary storage location to the secondary storage location. The first transfer of data may occur during a previous GMCV cycle, such that the data (which was initially stored in the first primary storage volume due to completing a previous normal-write request) is captured and copied to the first secondary storage volume. The second transfer of data may occur responsive to copying the data to the second primary storage volume, such that the copied data is captured and copied to the second secondary storage volume.

Embodiments of the present invention provide methods, systems, and computer program products for optimizing off-loaded I/O requests in asynchronous data replication environments. Embodiments of the present invention reduce network bandwidth utilization by no longer transferring copied data associated with off-loaded I/O requests over a network from a primary storage location to a secondary storage location.

FIG. 1 is a block diagram of distributed asynchronous data replication environment 100, in accordance with an embodiment of the present invention. Asynchronous data replication environment 100 includes host 110, storage array 120 (e.g., a first storage array), storage array 140 (e.g., a second storage array), which are connected via network 130. In this embodiment, asynchronous data replication environment 100 is configured to copy data stored in storage array 120 to storage array 140, as described in greater detail below. In one embodiment, a GMCV process may be implemented to accomplish asynchronous data replication. In another embodiment, another type of periodic replication that does not require write order fidelity can be implemented by asynchronous data replication environment 100 to accomplish asynchronous data replication.

Host 110 represents a platform configured to read data from, and write data to, a primary storage location (e.g., storage array 120). Host 110 can be a desktop computer, laptop computer, specialized computer server, or any other computer system known in the art. In certain embodiments, host 110 may represent computer systems utilizing clustered computers and components to act as a single pool of seamless resources when accessed through network 130. For example, such embodiments may be used in data center, cloud computing, storage area network (SAN), wide area network (WAN), and network attached storage (NAS) applications. In certain embodiments, host 110 represents a virtual machine. In general, host 110 is representative of any electronic device, or combination of electronic devices, capable of executing machine-readable program instructions, in accordance with an embodiment of the present invention, as described in greater detail with regard to FIG. 4. In other embodiments, host 110 may be implemented in a cloud computing environment, as described in greater detail with regard to FIGS. 5 and 6.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between host 110, storage array 120, and storage array 140, in accordance with an embodiment of the invention.

Storage array 120 and storage array 140 each represent a cluster of storage repositories managed by a respective storage array controller 126 and 146. Storage array 120 may be part of a primary storage location where host 110 reads and writes host and/or application data. Storage array 140 may be part of a secondary storage location where the data stored in storage array 120 is replicated in storage array 140. In this embodiment, storage array 120 includes storage device 122 and storage device 124 which are storage volumes or logical drives configured with a file system for reading and writing data. Similarly, storage array 140 includes storage device 142 and storage device 144 which are also storage volumes or logical devices configured with a file system for reading and writing data. In one embodiment, storage devices 122, 124, 142, and 144 represent virtual disks which emulate one or more physical disk storage devices. For example, storage devices 122, 124, 142, and 144 may be disk images, part of a logical disk (e.g., a vDisk), and/or or a RAM disk. In this embodiment, storage device 122 and storage device 142 are in a replication relationship, such any data changes made to a region of storage device 122 is eventually synchronized (i.e., captured and copied) to a corresponding region of storage device 142. Similarly, storage device 124 and storage device 144 are also in a replication relationship.

Storage array 120 includes storage array controller 126, and storage array 140 includes storage array controller 146 which are configured to process and complete normal-write requests and off-load I/O requests, as described in greater detail later with regard to FIGS. 2 and 3. Host 110 may issue write or copy requests to storage array 120, which are received and processed by storage array controller 126. In this manner, storage array controller 126 handles storage resource management in storage array 120 and executes the received write or copy request on storage devices 122 and 124 without any participation from host 110. Furthermore, any changes made to storage devices 122 and 124 by storage array controller 126 are captured (e.g., captured using Flash-Copy®) and stored in a primary change storage volume) and then transferred over network 130 to storage array controller 146. Accordingly, storage array controller 146 handles storage resource management in storage array 140 and executes any steps required to complete the current GMCV cycle (e.g., capture and copy) to ensure that the data stored in storage array 140 is synchronized with the data captured most recently in storage array 120.

As previously described, asynchronous data replication environment 100 is configured to copy data stored in storage array 120 to storage array 140. In embodiments where a GMCV process is implemented to accomplish asynchronous data replication, an additional 'change storage volume' may be included in each of the storage arrays 120 and 140 (not depicted) to store changes to data stored in storage devices 122, 124, 142, and 144 and facilitate each GMCV replication cycle. Furthermore, a number of storage volumes (e.g., storage devices 122 and 124) in storage array 120 may be equal to a number of storage volumes (e.g., storage devices 142 and 144) in storage array 140, provided that each of the number of storage volumes in storage arrays 120 and 140 are configured in a one-to-one replication relationship, as previously described.

Each logical and/or virtual portion (e.g., partition, sector, block, etc.) of memory in each of storage devices 122, 124, 142, and 144 may be identified as a region. Furthermore, each region of storage devices 122 and 124 may be classified by storage array controller 126 as either a 'dirty' region, which indicates that the data stored in the region has been changed due to a completed normal-write request, or as a 'copied' region, which indicates that the data stored in the region has been copied due to a completed off-loaded I/O request. Accordingly, the data stored in each region of storage devices 122 and 124 is eventually replicated to corresponding regions of storage devices 142 and 144, such that if data changed in a first region of storage device 122 then the change is replicated in a first region of storage device 124.

The descriptions of the various embodiments of the present invention have been presented for the purposes of illustration, but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. For example, a greater or lesser number of storage devices 122, 124, 142, and 144 can be included in storage array 120 and storage array 140. In another example, storage array controllers 126 and 146 may be part of a single stand-alone storage controller which is separate from storage arrays 120 and 140, respectively, and connected to network 130.

Figure 2:
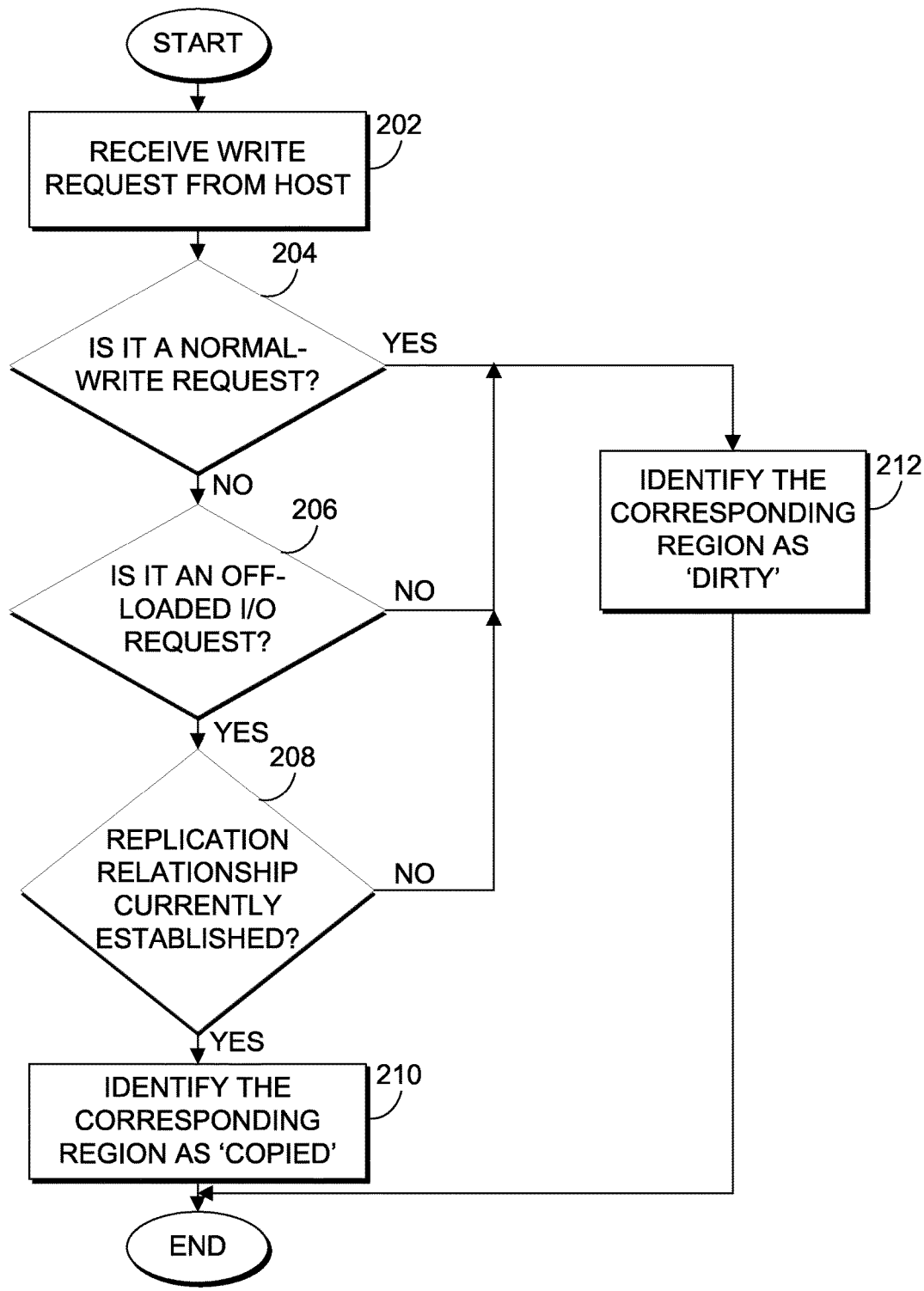
FIG. 2 is a flowchart illustrating operational steps for a storage array controller to process an incoming write request, in accordance with an embodiment of the present invention.

FIG. 2 is a flowchart illustrating operational steps for storage array controller 126 to process an incoming write request, in accordance with an embodiment of the present invention. Storage array controller 126 receives a write request from host 110 over network 130 (step 202). As previously described, host 110 may issue host and/or application write requests (i.e., normal-write requests) as well copy requests (i.e., off-loaded I/O requests) to storage array controller 126.

Storage array controller 126 determines whether the received write request is a normal-write request (decision 204). In one embodiment, storage array controller 126 may examine the received write request and determine whether the received write request normal-write request or an off-loaded I/O request. For example, if the received write request is a normal-write request (e.g., a write request issued by host 110 to write new data to one or more regions of storage devices 122 and 124), then the received write request may include a target location (e.g., one or more regions) to write the new data as well as the new data requested to be written. In another example, if the received write request is an off-loaded I/O request (e.g., a copy request to copy existing data from one or more regions of the storage volumes in storage array 120), then the received write request may include a source location from which the existing data is to be copied from (e.g., one or more regions), a target location to copy the existing data to, as well as specific instructions identifying which portions of data in the identified regions to copy. Accordingly, storage array controller 126 may examine the received write request to determine whether the received write request is a normal-write request or an off-loaded I/O request.

If storage array controller 126 determines that the received write request is a normal-write request ('yes' branch, decision 204), then storage array controller 126 indicates in a data structure that the corresponding region involved in the normal-write request is a 'dirty' region (step 212). As previously described, storage array controller 126 may examine the received write request to identify a target location (e.g., a region) specified by the received write request to write new data. In this embodiment, storage array controller 126 maintains a data structure, such as a table or index, indicating whether each region of storage devices 122 and 124 is a 'dirty' or 'copied' region, based on a type of write request received by storage array controller 126. In one embodiment, identifiers may be used to identify each region of storage devices 122 and 124, and each identifier may indicate whether the corresponding region is a 'dirty' or 'copied' region.

If storage array controller 126 determines that the received write request is not a normal-write request ('no' branch, decision 204), then storage array controller 126 determines whether the received write request is an off-loaded I/O request (decision 206). If storage array controller 126 determines that the received write request is not an off-loaded I/O request ('no' branch, decision 206), then storage array controller 126 indicates in the data structure that the corresponding region involved in the received write request is a 'dirty' region (step 212).

If storage array controller 126 determines that the received write request is an off-loaded I/O request ('yes' branch, decision 206), then storage array controller 126 determines whether a replication relationship replication currently established (i.e., is SRC/DST vDisk replicated) (decision 208). In one embodiment, storage array controller 126 may examine FlashCopy® mapping information which may indicate whether a previous GMCV cycle (i.e., capture step and copy step) was completed. If FlashCopy® mapping information indicates that a previous copy step was not completed successfully, then storage array controller 126 may determine that a replication relationship is not currently established between storage devices 122 and 124 with storage devices 142 and 144, respectively.

If storage array controller 126 determines that a replication relationship is currently not established ('no' branch, decision 208), then storage array controller 126 indicates in the data structure that the corresponding region involved in the off-loaded I/O request is a 'dirty' region. The corresponding region involved in the off-loaded I/O request is identified as a 'dirty' region because the determination made in decision 208 indicates that a replication relationship was not established to facilitate a successful replication process. Accordingly, the data contained in the corresponding region involved in the off-loaded I/O request is required to be appropriately replicated in storage array 140 to facilitate the asynchronous data replication process. If storage array controller 126 determines that a replication relationship is currently established ('yes' branch, decision 208), then storage array controller 126 identifies the corresponding region involved in the off-loaded I/O request as a 'copied' region (step 210). Accordingly, each region in storage devices 122 and 124 that were subjected to changed data due to completing host and/or application normal-write requests or completing off-loaded I/O requests is identified in the previously described data structure, whereby the data structure is used in subsequent processing as described in greater detail with regard to FIG. 3.

Figure 3:
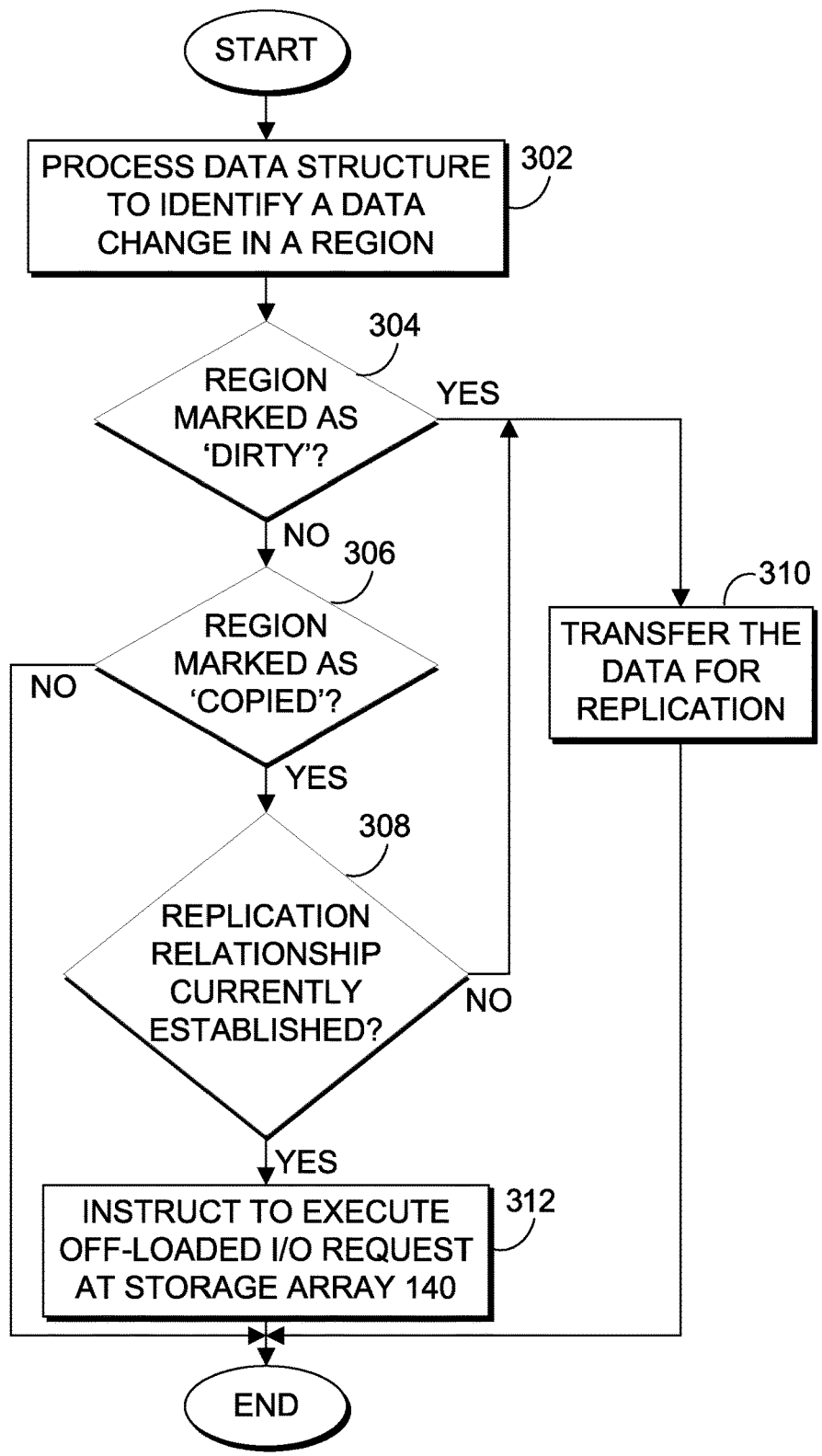
FIG. 3 is a flowchart illustrating operational steps for a storage array controller to handle data changes made to a storage array, in accordance with an embodiment of the present invention.

FIG. 3 is a flowchart illustrating operational steps for storage array controller 126 to handle data changes made to storage array 120, in accordance with an embodiment of the present invention. In one embodiment, operational steps as described herein may be performed during a capture step during a GMCV replication cycle. In another embodiment, operational steps described here at any time, in accordance with policies and control measures set forth by a disaster recovery plan to achieve desired recovery point objective (RPO) and recovery time objective (RTO) metrics.

Storage array controller 126 processes the data structure to identify a data change in a region of storage devices 122 and/or 124 (step 302). Storage array controller 126 then determines whether the region is marked (e.g., identified) as a 'dirty' region (step 304). As previously described, a 'dirty' region may be any region in storage devices 122 and 124 that includes changed data due to completing a normal-write request. In one embodiment, storage array controller 126 examines the data structure to determine whether the region in storage device 124 and/or storage device 122 is identified as a 'dirty' region (e.g., marked as 'D'). If, storage array controller 126 determines that the region is identified as a 'dirty' region ('yes' branch, decision 304), then storage array controller 126 transfers the identified data that changed due to completing a normal-write request to storage array 140 (step 310). If storage array controller 126 determines that the region is not identified as a 'dirty' region ('no' branch, decision 304), then storage array controller 126 determines whether the region is identified as a 'copied' region (decision 306). As previously described, a 'copied' region may be any region in storage devices 122 and 124 that includes changed data due to completing an off-loaded I/O request from storage device 122 to storage device 124. In one embodiment, storage array controller 126 examines the data structure to determine whether the region in storage device 124 and/or storage device 122 is identified as a 'copied' region (e.g., marked as 'C').

If storage array controller 126 determines that the region is identified as a 'copied' region ('yes' branch, decision 306), then storage array controller 126 determines whether a replication relationship is currently established, whereby this determination is similar to that described in decision 208 of FIG. 2 (decision 308). If storage array controller 126 determines that the region is not identified as a 'copied' region ('no' branch, decision 306), then operational steps as described herein are terminated.

If storage array controller 126 determines that a replication relationship is not currently established ('no' branch, decision 308), then storage array controller 126 transfers to storage array 140 the identified data that changed due to completing an off-loaded I/O request (e.g., a 'copied' region) (step 310). As previously described, the determination made in decision 308 indicates that a replication relationship was not established to facilitate a successful replication process. Accordingly, the data contained in the corresponding region involved in the off-loaded I/O request must be appropriately replicated in storage array 140 to facilitate the asynchronous data replication process. If storage array controller 126 determines that a replication relationship is currently established ('yes' branch, decision 308), then storage array controller 126 instructs storage array controller 146 to execute the off-loaded I/O request in storage array 140, which was previously completed in storage array 120 (step 312).

It should be understood that, to appropriately execute the off-loaded I/O request in storage array 140, storage array controllers 126 and 146 must identify the corresponding pair of storage devices 122, 124, 142, and 144. For example, asynchronous data replication environment 100 may be configured such that storage device 124 is paired with storage device 144 (i.e., has a replication relationship) and storage device 122 is paired with storage device 142. In this example, if step 312 is performed, then storage array controllers 126 and 146 may identify a source or primary storage repository involved in the completed off-loaded I/O in storage array 120 (e.g., storage device 122 and/or storage device 124) and determine the paired target or secondary storage repository in storage array 140 (e.g., storage device 142 and/or storage device 144). Furthermore, if an off-loaded I/O request involves storage array controller 126 copying a set of data from a first region of storage device 124 to a second region of storage device 122, then to perform step 312, storage array controller 146 copies a set of data from a first region of storage device 144 to a second region of storage device 142, which is indicated as a 'copied' region in the data structure maintained by storage array controller 126.

Figure 4:
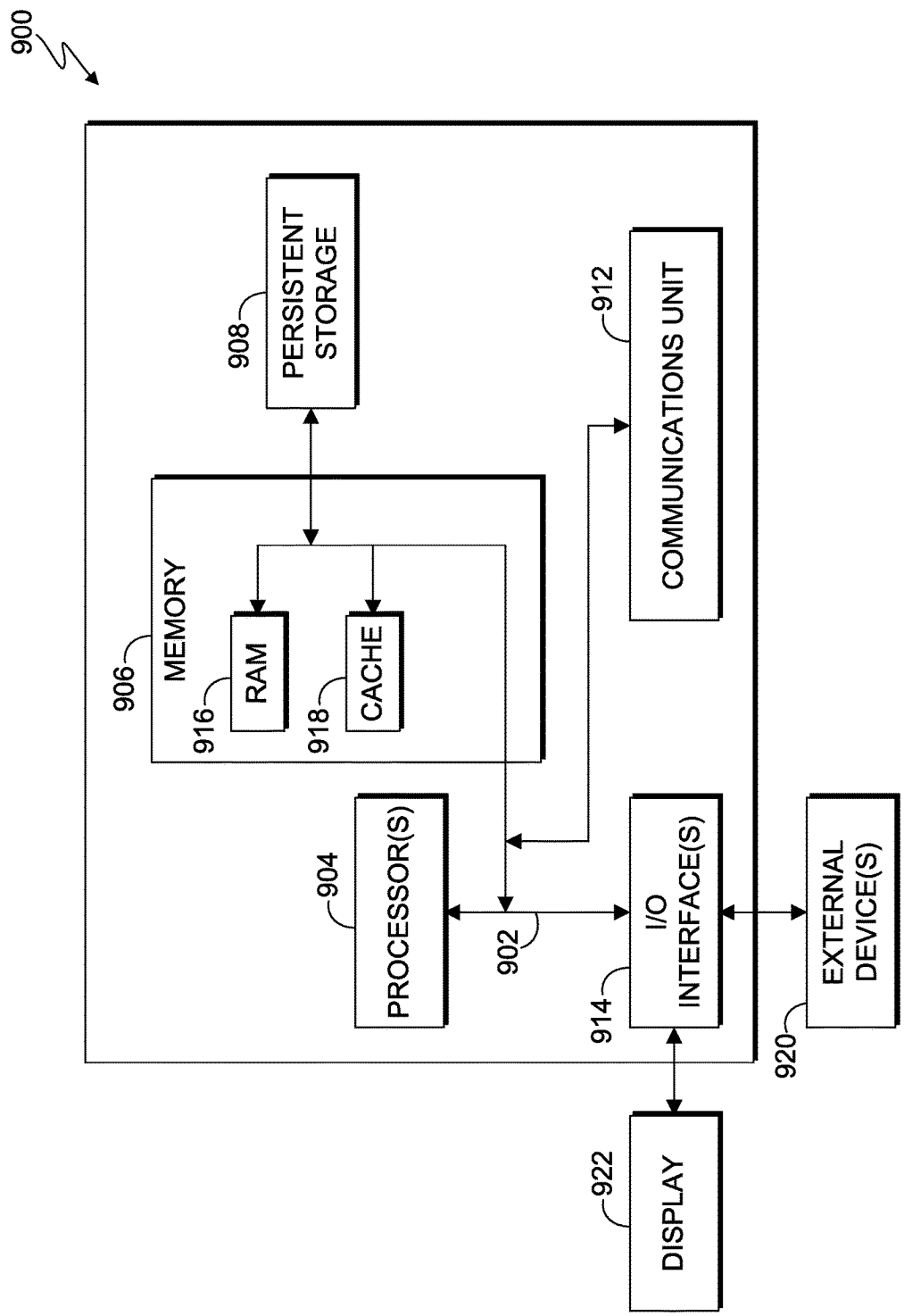
FIG. 4 is a block diagram of internal and external components of the computer systems of FIG. 1, in accordance with an embodiment of the present invention.

FIG. 4 is a block diagram of internal and external components of a computer system 900, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 900 includes communications fabric 902, which provides for communications between one or more processors 904, memory 906, persistent storage 908, communications unit 912, and one or more input/output (I/O) interfaces 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media. Software is stored in persistent storage 908 for execution and/or access by one or more of the respective processors 904 via one or more memories of memory 906.

Persistent storage 908 may include, for example, a plurality of magnetic hard disk drives. Alternatively, or in addition to magnetic hard disk drives, persistent storage 908 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 908 can also be removable. For example, a removable hard drive can be used for persistent storage 908. Other examples include optical and magnetic disks, thumb drives, and smart cards that are inserted into a drive for transfer onto another computer-readable storage medium that is also part of persistent storage 908.

Communications unit 912 provides for communications with other computer systems or devices via a network (e.g., network 130). In this exemplary embodiment, communications unit 912 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 912 (e.g., via the Internet, a local area network or other wide area network). From communications unit 912, the software and data can be loaded onto persistent storage 908.

One or more I/O interfaces 914 allow for input and output of data with other devices that may be connected to computer system 900. For example, I/O interface 914 can provide a connection to one or more external devices 920, such as a keyboard, computer mouse, touch screen, virtual keyboard, touch pad, pointing device, or other human interface devices. External devices 920 can also include portable computer-readable storage media such as, for example, thumb drives, portable optical or magnetic disks, and memory cards. I/O interface 914 also connects to display 922.

Display 922 provides a mechanism to display data to a user and can be, for example, a computer monitor. Display 922 can also be an incorporated display and may function as a touch screen, such as a built-in display of a tablet computer.

Figure 5:
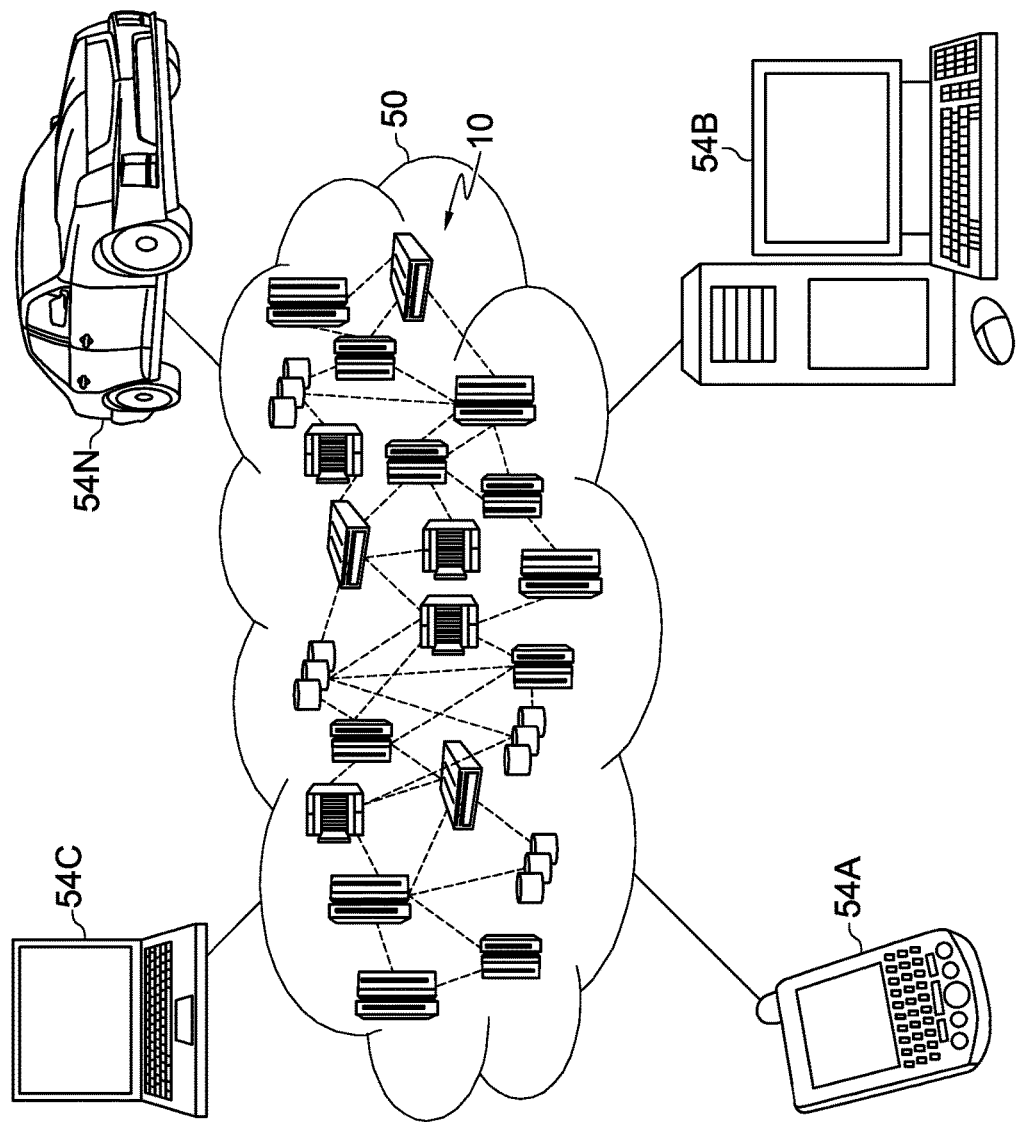
FIG. 5 depicts a cloud computing environment, in accordance with an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. The types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Figure 6:
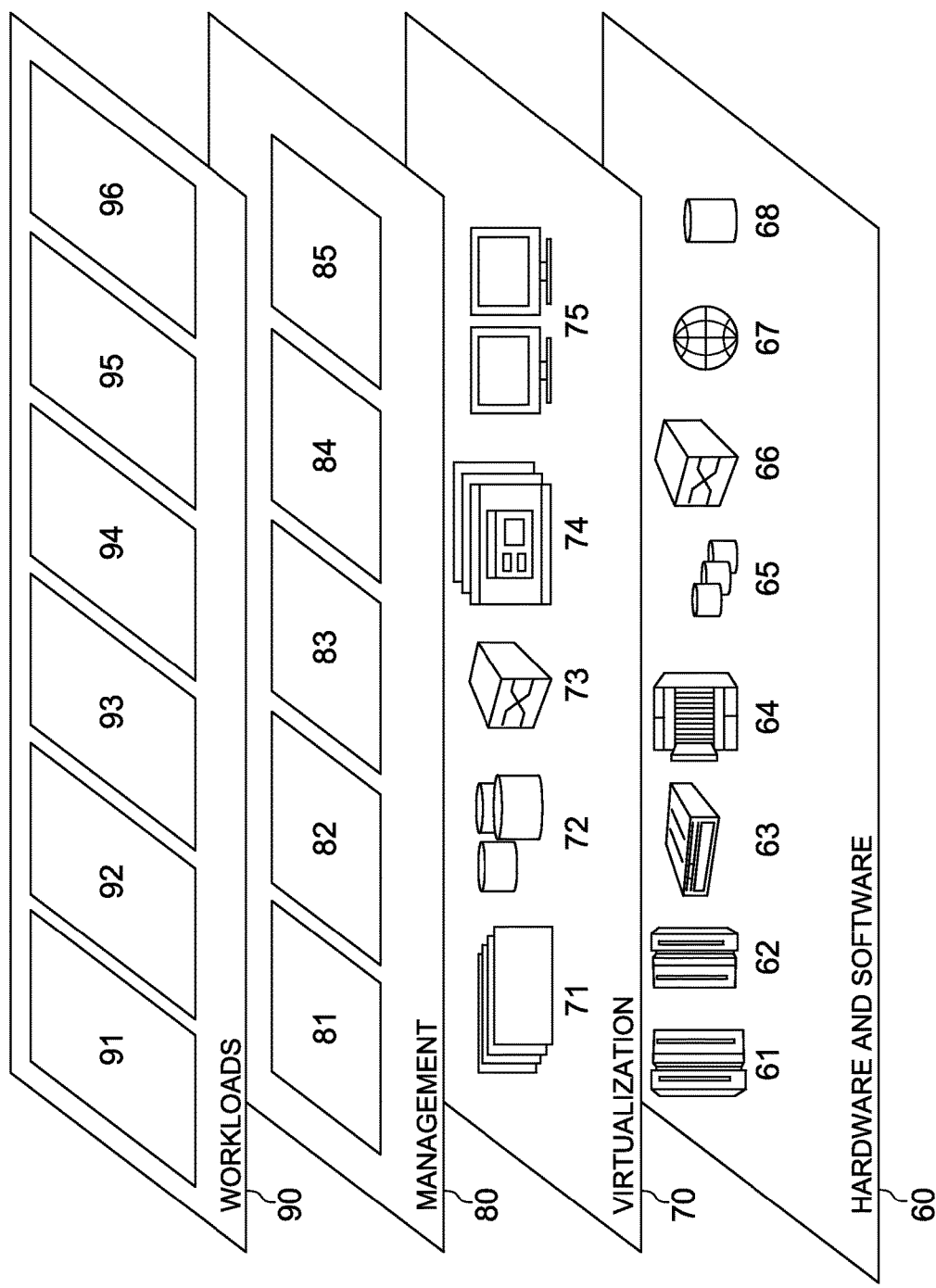
FIG. 6 depicts abstraction model layers, in accordance with an embodiment of the present invention.

Referring now to FIG. 6, a set of functional abstraction layers provided by cloud computing environment 50 (FIG. 5) is shown. The components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and asynchronous data replication environment 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   determining, by one or more computer processors, whether a replication relationship is established between a first storage device and a second storage device for an asynchronous data replication process over a network, wherein the replication relationship establishes data parity between a first region of the first storage device and a first region of the second storage device, and data parity between a second region of the first storage device and a second region of the second storage device;
   responsive to determining that the replication relationship is established between the first storage device and the second storage device, determining, by the one or more computer processors, whether data in the first region of the first storage device has changed since a previously completed asynchronous data replication process;
   responsive to determining that the data in the first region of the first storage device has changed since the previously completed asynchronous data replication process, determining, by the one or more computer processors, whether the changed data in the first storage device is data copied from the second region of the first storage device; and
   responsive to determining that the changed data in the first region of the first storage device is data copied from the second region of the first storage device, replicating data from the second region of the second storage device to the first region of the second storage device, wherein the first region of the second storage device has data parity with the first region of the first storage device.

2. The method of claim 1, further comprising:
   responsive to determining that the changed data in the first storage device is data copied from the second region of the first storage device, recording, by the one or more computer processors, in a data structure: a source identifier identifying the second region of the first storage device, a target identifier identifying the first region of the first storage device, and an indication that the changed data is copied data; and
   wherein replicating the data from the second region of the second storage device to the first region of the second storage device comprises:

identifying the source identifier which corresponds to the second region of the second storage device, the target identifier which corresponds to the first region of the second storage device, and the data identifier; and replicating the data from the second region of the second storage device to the first region of the second storage device based on the source identifier and the target identifier.

3. The method of claim 2, further comprising:

responsive to determining that the changed data in the first region of the first storage device is not data copied from the second region of the first storage device, determining, by the one or more computer processors, whether the changed data in the first region of the first storage device is new data;

responsive to determining that the changed data in the first region of the first storage device is the new data, recording, by the one or more computer processors, in the data structure: the target identifier identifying the first region of the first storage device, and a second indication that the changed data is not available in the first region nor the second region of the second storage device; and transmitting, by the one or more computer processors, the new data from the first region of the first storage device to the first region of the second storage device over the network to complete the asynchronous data replication process.

4. The method of claim 2, further comprising:

responsive to determining that data parity is not established between the second region of the first storage device and the second region of the second storage device, determining, by the one or more computer processors, whether data in the first region of the first storage device has changed since the previously completed asynchronous data replication process;

responsive to determining that the changed data in the first storage device is data copied from the second region of the first storage device, recording, by the one or more computer processors, in the data structure: the source identifier identifying the second region of the first storage device, the target identifier identifying the first region of the first storage device, and the second indication that the changed data is not available in the first region nor the second region of the second storage device;

transmitting, by the one or more computer processors, the changed data from the first region of the first storage device to the second region of the second storage device over the network, wherein the changed data becomes available in the second region of the second storage device; and replicating the changed data from the second region of the second storage device to the first region of the second storage device based on the source identifier and the target identifier.

5. The method of claim 4, wherein determining whether data parity is established between the second region of the first storage device and the second region of the second storage device comprises:

referencing, by the one or more computer processors, mapping information indicating whether the previously completed asynchronous data replication process successfully replicated established data parity between the first region of the first storage device and the first region of the second storage device, and data parity between the second region of the first storage device and the second region of the second storage device.

6. The method of claim 3, wherein the changed data is written to the first region of the first storage device based on a received write request, and wherein the write request is either a normal-write request which indicates to write the new data to the first region of the first storage device, or an off-loaded input/output (I/O) request which indicates to copy data to the first region of the first storage device.

7. The method of claim 6, further comprising:

examining, by the one or more computer processors, the received write request to determine whether the received write request is the normal-write request or the off-loaded I/O request.

8. A computer program product comprising:

one or more computer readable storage media and program instructions stored on the one or more computer readable storage media, the program instructions comprising:

program instructions to determine whether a replication relationship is established between a first storage device and a second storage device for an asynchronous data replication process over a network, wherein the replication relationship establishes data parity between a first region of the first storage device and a first region of the second storage device, and data parity between a second region of the first storage device and a second region of the second storage device;

program instructions to, responsive to determining that the replication relationship is established between the first storage device and the second storage device, determine whether data in the first region of the first storage device has changed since a previously completed asynchronous data replication process;

program instructions to, responsive to determining that the data in the first region of the first storage device has changed since the previously completed asynchronous data replication process, determine whether the changed data in the first storage device is data copied from the second region of the first storage device; and program instructions to, responsive to determining that the changed data in the first region of the first storage device is data copied from the second region of the first storage device, replicate data from the second region of the second storage device to the first region of the second storage device, wherein the first region of the second storage device has data parity with the first region of the first storage device.

9. The computer program product of claim 8, wherein the program instructions stored on the one or more computer readable storage media further comprise:

program instructions to, responsive to determining that the changed data in the first storage device is data copied from the second region of the first storage device, record in a data structure: a source identifier identifying the second region of the first storage device, a target identifier identifying the first region of the first storage device, and an indication that the changed data is copied data; and wherein the program instructions to replicate the data from the second region of the second storage device to the first region of the second storage device comprise:

program instructions to identify the source identifier which corresponds to the second region of the second storage device, the target identifier which corresponds to the first region of the second storage device, and the data identifier; and program instructions to replicate the data from the second region of the second storage device to the first region of the second storage device based on the source identifier and the target identifier.

10. The computer program product of claim 9, wherein the program instructions stored on the one or more computer readable storage media further comprise:
program instructions to, responsive to determining that the changed data in the first region of the first storage device is not data copied from the second region of the first storage device, determine whether the changed data in the first region of the first storage device is new data;
program instructions to, responsive to determining that the changed data in the first region of the first storage device is the new data, record in the data structure: the target identifier identifying the first region of the first storage device, and a second indication that the changed data is not available in the first region nor the second region of the second storage device; and
program instructions to transmit the new data from the first region of the first storage device to the first region of the second storage device over the network to complete the asynchronous data replication process.

11. The computer program product of claim 9, wherein the program instructions stored on the one or more computer readable storage media further comprise:
program instructions to, responsive to determining that data parity is not established between the second region of the first storage device and the second region of the second storage device, determine whether data in the first region of the first storage device has changed since the previously completed asynchronous data replication process;
program instructions to, responsive to determining that the changed data in the first storage device is data copied from the second region of the first storage device, record in the data structure: the source identifier identifying the second region of the first storage device, the target identifier identifying the first region of the first storage device, and the second indication that the changed data is not available in the first region nor the second region of the second storage device;
program instructions to transmit the changed data from the first region of the first storage device to the second region of the second storage device over the network, wherein the changed data becomes available in the second region of the second storage device; and
program instructions to replicate the changed data from the second region of the second storage device to the first region of the second storage device based on the source identifier and the target identifier.

12. The computer program product of claim 11, wherein the program instructions to determine whether data parity is established between the second region of the first storage device and the second region of the second storage device comprise:
program instructions to reference mapping information indicating whether the previously completed asynchronous data replication process successfully replicated established data parity between the first region of the first storage device and the first region of the second storage device, and data parity between the second region of the first storage device and the second region of the second storage device.

13. The computer program product of claim 10, wherein the changed data is written to the first region of the first storage device based on a received write request, and wherein the write request is either a normal-write request which indicates to write the new data to the first region of the first storage device, or an off-loaded input/output (I/O) request which indicates to copy data to the first region of the first storage device.

14. The computer program product of claim 13, wherein the program instructions stored on the one or more computer readable storage media further comprise:
program instructions to examine the received write request to determine whether the received write request is the normal-write request or the off-loaded I/O request.

15. A computer system comprising:
one or more computer processors;
one or more computer readable storage media;
program instructions stored on the one or more non-transitory computer readable storage media for execution by at least one of the one or more processors, the program instructions comprising:
program instructions to determine whether a replication relationship is established between a first storage device and a second storage device for an asynchronous data replication process over a network, wherein the replication relationship establishes data parity between a first region of the first storage device and a first region of the second storage device, and data parity between a second region of the first storage device and a second region of the second storage device;
program instructions to, responsive to determining that the replication relationship is established between the first storage device and the second storage device, determine whether data in the first region of the first storage device has changed since a previously completed asynchronous data replication process;
program instructions to, responsive to determining that the data in the first region of the first storage device has changed since the previously completed asynchronous data replication process, determine whether the changed data in the first storage device is data copied from the second region of the first storage device; and
program instructions to, responsive to determining that the changed data in the first region of the first storage device is data copied from the second region of the first storage device, replicate data from the second region of the second storage device to the first region of the second storage device, wherein the first region of the second storage device has data parity with the first region of the first storage device.

16. The computer system of claim 15, wherein the program instructions stored on the one or more non-transitory computer readable storage media further comprise:
program instructions to, responsive to determining that the changed data in the first storage device is data copied from the second region of the first storage device, record in a data structure: a source identifier identifying the second region of the first storage device, a target identifier identifying the first region of the first storage device, and an indication that the changed data is copied data; and
wherein the program instructions to replicate the data from the second region of the second storage device to the first region of the second storage device comprise:
program instructions to identify the source identifier which corresponds to the second region of the second storage device, the target identifier which corresponds to the first region of the second storage device, and the data identifier; and program instructions to replicate the data from the second region of the second storage device to the first region of the second storage device based on the source identifier and the target identifier.

17. The computer system of claim 16, wherein the program instructions stored on the one or more non-transitory computer readable storage media further comprise:

program instructions to, responsive to determining that the changed data in the first region of the first storage device is not data copied from the second region of the first storage device, determine whether the changed data in the first region of the first storage device is new data;

program instructions to, responsive to determining that the changed data in the first region of the first storage device is the new data, record in the data structure: the target identifier identifying the first region of the first storage device, and a second indication that the changed data is not available in the first region nor the second region of the second storage device; and program instructions to transmit the new data from the first region of the first storage device to the first region of the second storage device over the network to complete the asynchronous data replication process.

18. The computer system of claim 16, wherein the program instructions stored on the one or more non-transitory computer readable storage media further comprise:

program instructions to, responsive to determining that data parity is not established between the second region of the first storage device and the second region of the second storage device, determine whether data in the first region of the first storage device has changed since the previously completed asynchronous data replication process;

program instructions to, responsive to determining that the changed data in the first storage device is data copied from the second region of the first storage device, record in the data structure: the source identifier identifying the second region of the first storage device, the target identifier identifying the first region of the first storage device, and the second indication that the changed data is not available in the first region nor the second region of the second storage device;

program instructions to transmit the changed data from the first region of the first storage device to the second region of the second storage device over the network, wherein the changed data becomes available in the second region of the second storage device; and program instructions to replicate the changed data from the second region of the second storage device to the first region of the second storage device based on the source identifier and the target identifier.

19. The computer system of claim 18, wherein the program instructions to determine whether data parity is established between the second region of the first storage device and the second region of the second storage device comprise:

program instructions to reference mapping information indicating whether the previously completed asynchronous data replication process successfully replicated established data parity between the first region of the first storage device and the first region of the second storage device, and data parity between the second region of the first storage device and the second region of the second storage device.

20. The computer system of claim 17, wherein the changed data is written to the first region of the first storage device based on a received write request, and wherein the write request is either a normal-write request which indicates to write the new data to the first region of the first storage device, or an off-loaded input/output (I/O) request which indicates to copy data to the first region of the first storage device.

* * * * *